United States Patent
Shimoji

[11] Patent Number: 6,156,219
[45] Date of Patent: Dec. 5, 2000

[54] PROCESS OF MAKING MONOLITHIC CAVITY MICROCHIPS

[76] Inventor: Yutaka Shimoji, 2125 University Ct., Clearwater, Fla. 34624

[21] Appl. No.: 09/001,448

[22] Filed: Dec. 31, 1997

[51] Int. Cl.[7] .............................. B29D 11/00; H01S 3/08
[52] U.S. Cl. ................................ 216/24; 216/88; 216/26; 372/92
[58] Field of Search ................................ 216/27, 24, 26; 372/92

[56] References Cited

U.S. PATENT DOCUMENTS

| | | | |
|---|---|---|---|
| 5,177,764 | 1/1993 | Nilsson | 372/94 |
| 5,375,138 | 12/1994 | Kozlovsky et al. | 372/92 |
| 5,574,740 | 11/1996 | Hargis et al. | 372/41 |
| 5,651,023 | 7/1997 | MacKinnon | 372/107 |
| 5,838,713 | 11/1998 | Shimoji | 372/92 |

*Primary Examiner*—Randy Gulakowski
*Assistant Examiner*—Shamim Ahmed

[57] ABSTRACT

Fabrication techniques to from a multi-structured monolithic cavity that generates a single axial mode of laser operation are described. These simple techniques improve laser performance and reliability while minimizing the number of process steps. Mass production of high performance lasers will become possible by using these techniques.

14 Claims, 3 Drawing Sheets

PROCESS OF MAKING MONOLITHIC CAVITY MICROCHIPS

BACKGROUND OF THE INVENTION

The present invention relates to the process of manufacturing monolithic cavities and the structure of monolithic cavity microchips for use in photon generation. Known monolithic cavities produce very restricted bands of frequencies with low efficiency and have many costly manufacturing steps.

U.S. Pat. No. 5,574,740 to Hargis et al. discloses small annular dielectric spacers that create an air gap for heat dissipation which are bonded with epoxy to the laser medium and the doubling crystal that are 50–500μ wide in a composite cavity laser having 4 dielectrically coated, polished, parallel, flat surfaces.

MacKinnon discloses in U.S. Pat. No. 5,651,023 directly optically contacted gain and frequency doubling crystals whose contact surfaces are highly polished and flat.

The prior art does not disclose any process of manufacturing rounded edges and wedge shaped gaps in the interface between the gain material and frequency doubling material.

The goal of the instant inventive device is to provide an efficient and simple process of manufacturing monolithic cavity optical contacts and diffusion bonds which include gaps useful, principally in laser fabrication, to provide a single axial mode, to reduce the cost and number of manufacturing steps and to improve reliability and efficiency.

SUMMARY OF THE INVENTION

One objective of the instant invention is to provide a process of making gaps in a composite monolithic cavity microchip for generating a signal axial mode output. This objective is realized by a processes including: precisely polishing, etching, epitaxially forming and lithographically producing gaps into the interface of solid state materials which are then joined together.

Another objective is to provide a simple, reliable, and efficient method of joining solid state materials to form a monolithic cavity. This objective is realized by directly contacting the materials to form an optical contact. Alternatively, this is done by thermal diffusion bonding. No intermediate oils, adhesives, or dielectrics are used in the interface to be joined. This eliminates the extra cost of these manufacturing steps and enhances reliability.

BRIEF DESCRIPTION OF DRAWINGS

The objects, advantages and features of the instant invention will be more clearly understood from the following detailed description, when read in conjunction with the accompanying drawings, in which.

DESCRIPTION OF PREFERRED EMBODIMENTS

Figure 1:
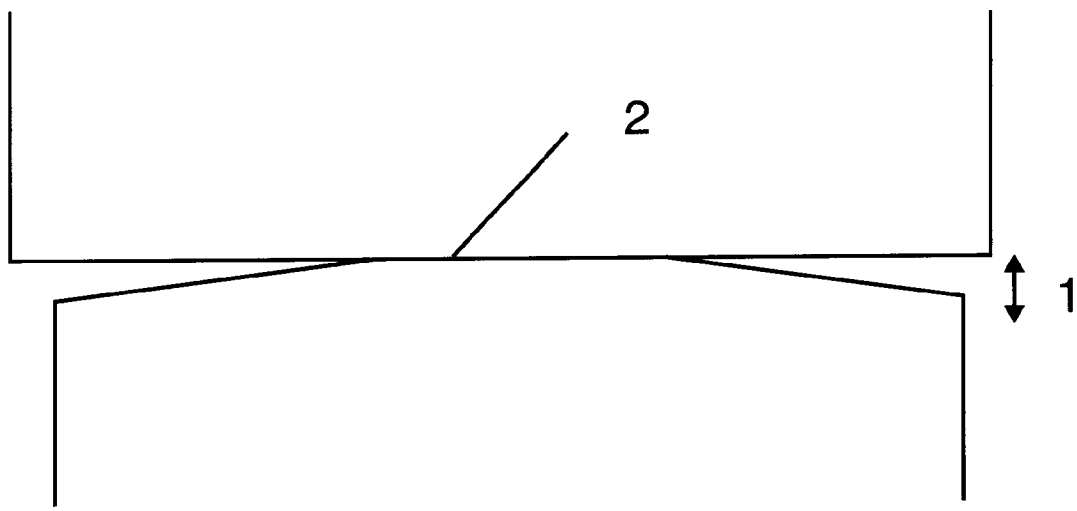
FIG. 1 is a cross sectional view of a wedge shaped gap formed on one surface edge of one of the solid state materials which are joined together to form a monolithic cavity.
Figure 2:
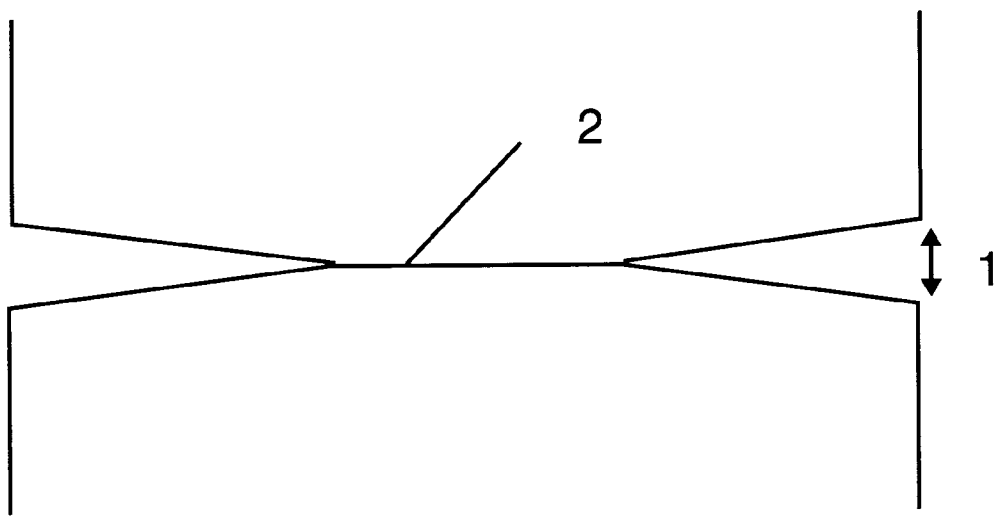
FIG. 2 is a cross sectional view of a wedge shaped gap formed on both surfaces at an edge of the solid state materials which are joined together to form a monolithic cavity.
Figure 3:
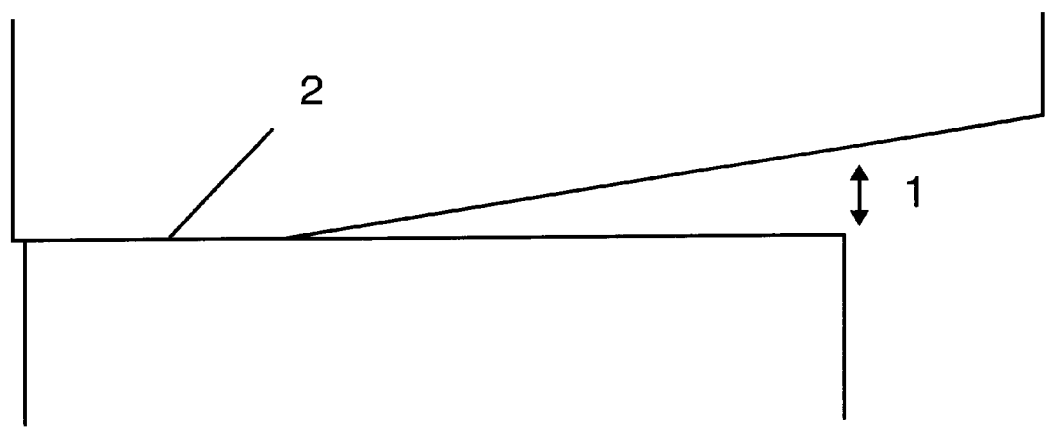
FIG. 3 is a cross sectional view of a wedge shaped gap that extends more than half way through the interface of the solid state materials that are joined together to form a monolithic cavity.
Figure 4:
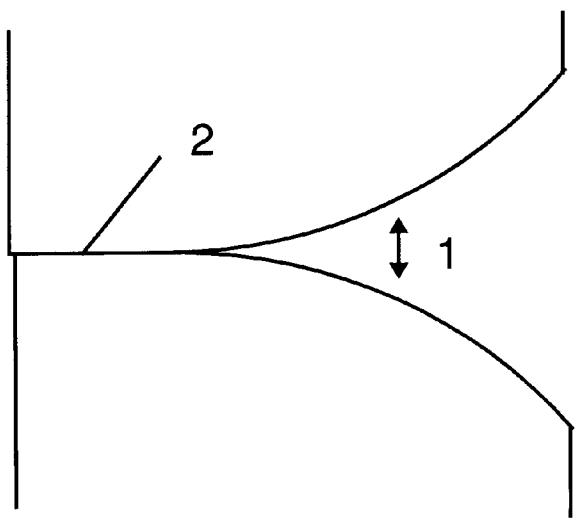
FIG. 4 is a cross sectional view of a curved gap at an edge of the interface of materials that are joined to form a monolithic cavity.
Figure 5:
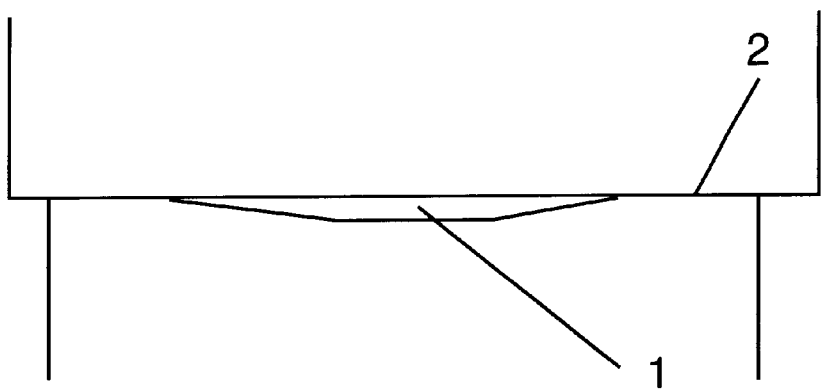
FIG. 5 is a cross sectional view of a curved gap in the center of a surface of one of the two materials that are joined together to form a monolithic cavity.

The main feature of the instant invention which contributes to the achievement of the objectives of the invention is the process of polishing the end faces of at least two solid state materials which are joined together to form a monolithic cavity microchip. The surface of at least one of these materials is polished until at least one surface depression with rounded edges are formed. This forms a gap 1 in the interface 2 shown in FIGS. 1,2,3,4, and 5 when these materials are joined along the polished surface. The presence of a gap forces the microchip to operate in a single axial mode resulting in a single output frequency. The optimum size of the gap is at most 0.5 mm in width. FIG. 1 shows a wedge shaped gap that is formed by polishing the surface of just one of the materials that are joined together. The angle formed by the surfaces of the gap 1 is large when a soft polishing pad is used and the angle is small when a hard polishing pad is used. FIG. 2 shows a wedge shaped gap 1 that is formed into both surfaces of the materials which are joined together. FIG. 3 shows a wedge shaped gap 1 extending from an edge to more than half way to the center of the interface 2. FIG. 4 shows an exponentially curved gap 1 at the edge of the surfaces of the materials which are joined to 1:form the monolithic cavity. FIG. 5 shows a curved gap 1 which is formed into the center of the interface 2 by the process of polishing at an angle to the interface 2 with a pad which is smaller in diameter than the length of the interface 2. The precise curvature of these surface depressions which form the gaps 1 is controlled by the hardness of the polishing pad and the duration of polishing.

Figure 6:
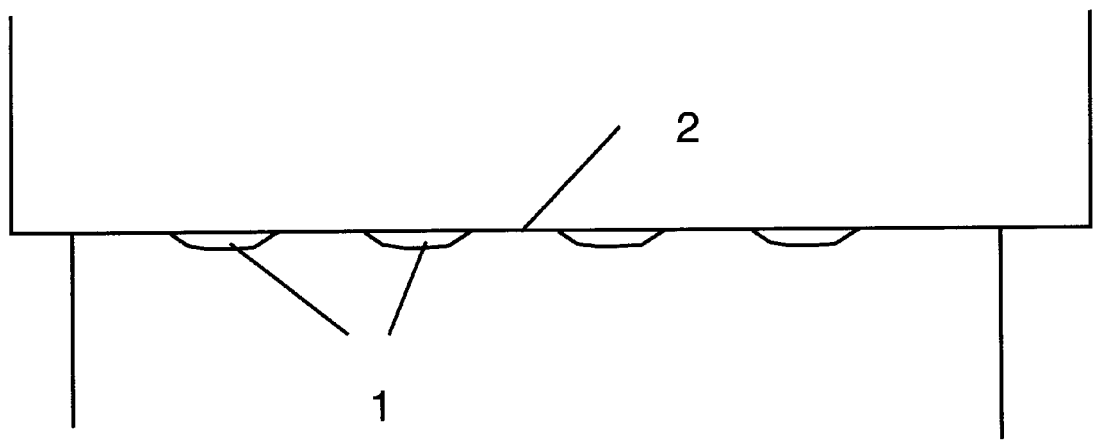
FIG. 6 is a cross sectional view of gaps which are formed into the surface of one of the two materials that are joined at that surface to form a monolithic cavity.

In another embodiment shown in FIG. 6 multiple gaps 1 may be formed by the process of chemically etching more than one surface depression in the surface of at least one of the, materials which are subsequently joined at the interface 2.

In another embodiment the surface depressions which form the gaps 1 are produced by lithography. In another embodiment the gaps 1 are produced by the methods of epitaxial growth. These two processes allow smaller and more precisely formed gaps 1 to be formed in the interface 2.

One of the at least two solid state materials is a laser gain material such as YAG, for example, and the other material is a frequency doubling material such as $KNbO_3$, for example. In another embodiment both materials are gain materials. In one example the solid state materials are crystalline, and in another example they are made of an amorphous matter.

Another feature of the present invention is the process of joining the at least two solid state materials to form the monolithic cavity microchip. One process is to form a direct optical contact at the interface 2 after the process of forming the gap 1 or gaps 1 by the application of pressure perpendicular to the interface 2. Another method is to form a thermal diffusion bond after the step of gap 1 formation by the application of heat and pressure. There is no requirement for the inclusion of any dielectric, air, nor any bonding agent to join the solid state materials together. These methods are superior to the use of oils and adhesive agents because there is no degradation of theses chemicals at the interface 2 over time. This has severely limited the life of microchip lasers of the prior art. Both of these methods of joining also ensure that the gain material and frequency doubling solid state materials are attached only at the end faces so that thermal expansion and contraction does not unduly stress the laser cavity.

Accordingly for all these reasons set forth, it is seen that both the processes of manufacturing and the structure of the specially formed monolithic cavity microchip of the present invention represents a significant advancement in the art of microchip lasers and has substantial commercial merit.

While there is shown and described herein certain specific structures embodying the invention, it will be manifest to those skilled in the art that modifications may be made without departing from the spirit and the scope of the underlying inventive concept. The present invention shall not be limited to the particular process steps and structural forms herein shown and described except by the scope of the appended claims.

What is claimed is:

1. The process of manufacturing a monolithic cavity optical contact comprising the steps of: forming at least one surface depression in the surface of at least one solid state material by any one process selected from the group consisting of polishing, etching, epitaxial growth, and lithography; and forming a direct optical contact at an interface of said surface of said solid state material containing said depression and at least a second solid state material with an application of pressure perpendicular to said surface, inclusion of said depression forming a gap in said contact at said interface, a shape of said depression being such that a depth of said depression is different at edges of said depression than at a center of said depression.

2. The process of claim 1 wherein said solid state material may be any one material selected from the group consisting of crystalline matter and amorphous matter.

3. The process of claim 1 wherein the step of forming said at least one depression in the surface said material is continued until at least one a spherically curved depression is formed.

4. The process of claim 1 wherein the degree of curvature of said depression is fine-tuned by the selection of the hardness of a pad used to polish said surface, a small degree of curvature is created by a hard pad, and a great degree of curvature is created by a soft pad.

5. The process of claim 2 wherein said optical contact includes at least one wedge shaped gap, said wedge shaped gap opens in the radially outward direction away from the center of said surface and toward the edges of said material.

6. The process of claim 5 wherein the process step of forming said surface depression in said surface continues until said wedge shaped gap extends more than half way to the center of said surface forming said optical contact.

7. The process of claim 5 wherein the angle formed in said wedge shaped gap is fine-tuned by the selection of the hardness of a pad used to polish said surface, said angle is small when a hard polishing pad is used, and said angle is large when a soft polishing pad is used.

8. The process of manufacturing a monolithic cavity diffusion bond comprising the steps of: forming at least one surface depression in the surface of at least one solid state material by any one process selected from the group consisting of polishing, etching, epitaxial growth, and lithography; and forming a diffusion bond between said surface of said solid state material and at least a second solid state material along their interface with application of heat and pressure, such that a gap is formed by inclusion of said depression in said bond at said interface, a shape of said depression being such that a depth of said depression is different at edges of said depression than at a center of said depression.

9. The process of claim 8 wherein said solid state material may be any one selected from the group consisting of crystalline matter and amorphous matter.

10. The process of claim 8 wherein the step of forming said at least one depression in the surface of said material is continued until at least one asherically curved surface is formed.

11. The process of claim 8 wherein the degree of curvature of said depression is fine-tuned by selection of the hardness of a pad used to polish said surface, a small degree of curvature is created by a hard pad and a great degree of curvature is created by a soft pad.

12. The process of claim 9 wherein said diffusion bond includes at least one wedge shaped gap, said wedge shaped gap opens radially outward away from the center of said surface and toward the edges of said material.

13. The process of claim 12 wherein the process step of forming said surface depression in said surface continues until said wedge shaped gap extends more than half way to the center of said surface forming said diffusion bond.

14. The process of claim 12 wherein the angle formed in said wedge shaped gap is fine-tuned by selection of the hardness of a pad used to polish said surface, said angle is small when a hard pad is used, and said angle is large when a soft pad is used.

* * * * *